(No Model.)
C. R. QUINBY & S. W. CORNELL.
Button Hole Cutter.
No. 238,965.        Patented March 15, 1881.
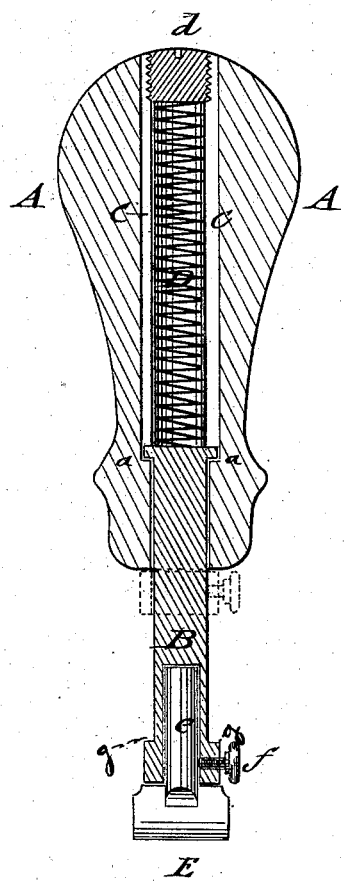
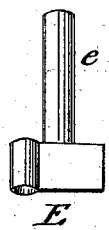
WITNESSES:
Carl Karp
Otto Risch
INVENTOR:
Charles R. Quinby and
Stephen W. Cornell
BY Paul Goepel
ATTORNEY

UNITED STATES PATENT OFFICE.

CHARLES R. QUINBY AND STEPHEN W. CORNELL, OF PLEASANTVILLE, N. Y.

BUTTON-HOLE CUTTER.

SPECIFICATION forming part of Letters Patent No. 238,965, dated March 15, 1881.

Application filed August 12, 1880. (No model.)

*To all whom it may concern:*

Be it known that we, CHARLES R. QUINBY and STEPHEN W. CORNELL, of Pleasantville, in the county of Westchester and State of New York, have invented certain new and useful Improvements in Button-Hole Cutters, of which the following is a specification.

In the accompanying drawings, Figure 1 represents a vertical central section of our improved button-hole cutter; and Figs. 2 and 3 are detail side views, respectively, o a chisel for cutting shoe button-holes and of a needle for finishing the eyelets of shirts.

Similar letters of reference indicate corresponding parts.

This invention has reference to an improved device by which the button-holes in shirts, collars, cuffs, shoes, &c., may be quickly and uniformly cut at the proper place, and also the eyelets of shirts be finished at a saving of time and labor and without injury to the stitches, which latter forms an annoying feature in the present cutting devices.

The invention consists of a button-hole cutter the shank of which is guided by projecting studs in interior guide-grooves of a hollow weighted handle, which slides down on the shank until it strikes a shoulder at the lower part of the same. A spiral spring is interposed between the shank and a tap-plug of the handle to raise the latter after use. Into the lower socket-shaped portion of the shank a chisel for common button-holes or an eyelet-finisher may be exchangeably inserted and secured by a clamping-screw or other device.

In the drawings, A represents the weighted handle of our improved button-hole cutter, which handle slides freely up and down on a shank, B, it being guided thereon by interior grooves, C, on side projections or studs, $a$, at the upper end of the shank. Between a screw-plug, $d$, at the upper end of the handle A and the top of the shank B is inserted a strong spiral spring, D, which serves to force the shank to the outside of the handle when the pressure on the same is released.

The lower socket-shaped end of the shank B is so arranged that the shanks of interchangeable chisels E may be inserted therein and secured by a clamp-screw, $f$. The chisel E is either of plain shape, as shown in Fig. 1, for cutting the common button-holes of shirts, collars, and cuffs, or provided with circular portion or eye at one end, as in Fig. 2, to cut button-holes with eyes at one end, such as are used in shoes, or it may be an eyelet-finisher formed of a concave portion with a central piercing-needle, as shown in Fig. 3.

To the lower part of the shank are applied fixed shoulders $g$, against which the handle strikes when it is quickly forced down for cutting the button-holes or finishing the eyelets, the chisel or pin having been first placed in proper position on the fabric. The button-hole is cut by the force of the concussion of the handle with the shoulder of the shank. The button-holes or eyelets are thereby formed in an accurate and reliable manner at the point required, so that even inexperienced hands may cut them without difficulty and at a considerable saving of time.

Having thus described our invention, we claim as new and desire to secure by Letters Patent—

In a button-hole cutter, the combination of a shank, B, having shoulders $g$ and $a$, and carrying a removable tool, E, and weighted handle A, arranged to slide upon the shank and strike the shoulder, and spring D, arranged to elevate the handle, all as set forth.

In testimony that we claim the foregoing as our invention we have signed our names, in presence of two witnesses, this 21st day of May, 1880.

CHARLES R. QUINBY.
STEPHEN WOOD CORNELL.

Witnesses:
PAUL GOEPEL,
CARL KARP.